G. H. PEABODY.
HULLING-MACHINE.
No. 175,148.          Patented March 21, 1876.
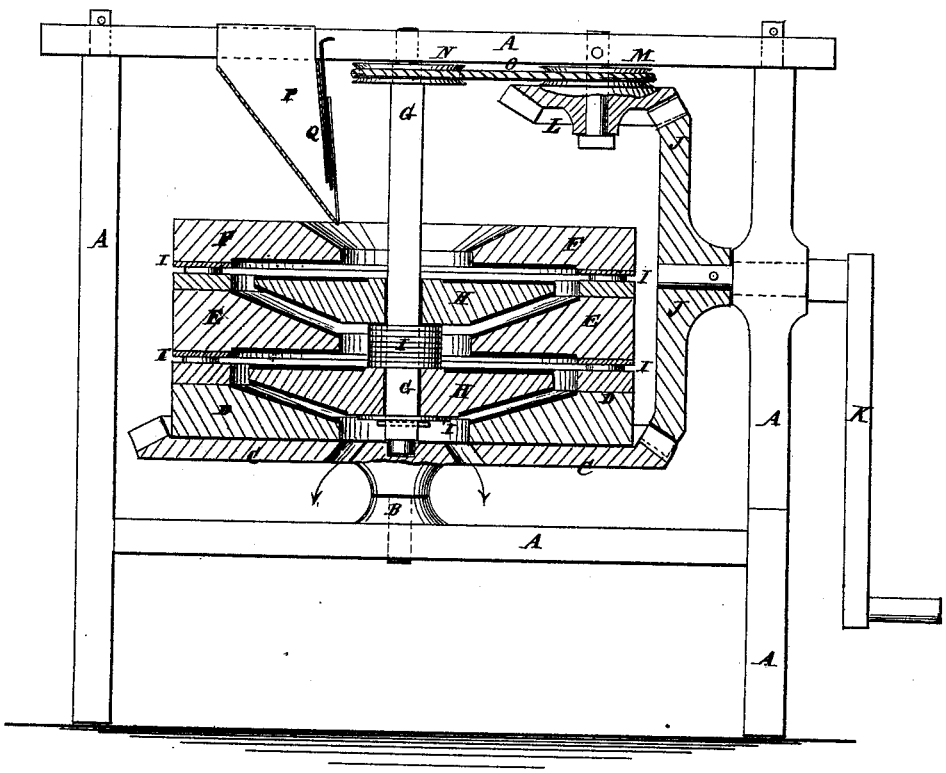
WITNESSES:
INVENTOR:
Geo. H. Peabody
BY
ATTORNEYS.

UNITED STATES PATENT OFFICE.

GEORGE H. PEABODY, OF BROOKLYN, NEW YORK.

IMPROVEMENT IN HULLING-MACHINES.

Specification forming part of Letters Patent No. 175,148, dated March 21, 1876; application filed July 17, 1875.

*To all whom it may concern:*

Be it known that I, GEORGE H. PEABODY, of Brooklyn, in the county of Kings and State of New York, have invented a new and useful Improvement in Machine for Hulling Small Grains, of which the following is a specification:

The figure is a vertical section of my improved machine.

The object of this invention is to furnish an improved hand machine of convenient size for hulling the seed of the African millet or imphee, and other small grains, which shall be simple in construction, strong, durable, and reliable, and effective in operation, removing the hulls thoroughly and without breaking the kernels.

The invention consists in the combination of the disks, provided with alternate concaved and flat emery surfaces, the wheels provided with alternate convexed and flat emery surfaces, the shaft, the gear-wheels, the pulleys, and band or equivalent gearing, and the crank, with each other, and the frame, as hereinafter fully described.

A is the frame of the machine, to the lower cross-bar of which is attached a step, B, in which works the journal of a large bevel-gear wheel, C. To the upper side of the wheel C is secured a disk, D, having a large hole through its center, and the upper side of which is concaved, and has a surface of emery composition applied to it. To the outer part of the disk D is bolted the outer part of a disk, E, which has a large hole formed through its center, and has a shallow circular recess formed upon its lower side, which is provided with a surface of emery composition. The upper side of the disk E is concaved, and is provided with a surface of emery composition. To the outer part of the upper side of the disk E is bolted the outer part of a disk, F, which has a large hole through its center, and a shallow circular recess upon its lower side provided with a surface of emery composition. The three disks D E F are rigidly connected with each other, and with the gear-wheel C, so as to be carried around by and with the said gear-wheel. G is a square shaft, the upper end of which revolves in bearings in the upper cross-bar of the frame A. The shaft G passes down through the holes, through the centers of the disks F E D, and its lower end revolves in a socket in the center of the gear-wheel C. H are two wheels, which have square holes formed through their centers to receive and fit upon the square shaft G, so that they may be carried around by and with said shaft in its revolution. The lower sides of the wheels H are convexed to correspond with the concavities in the upper sides of the disks D E, and their upper sides are flat, or nearly so, to correspond with the flat lower sides of the disks E F. The wheels H are provided with surfaces of emery composition upon their upper and lower sides. The disks D E F and the wheels H are kept at the proper distance apart by their washers I, interposed between them, so that they may be adjusted according to the size of the kernels to be operated upon, and to compensate for the wear by increasing or diminishing the number of said washers.

Any desired number of the disks and wheels may be used to form a set.

J is a bevel-gear wheel, the teeth of which mesh into the teeth of the bevel-gear wheel C, and its journal revolves in bearings attached to a post of the frame A, and has a crank, K, attached to its outer end, by means of which the machine is operated. The teeth of the bevel-gear wheel J also mesh into the teeth of a small bevel-gear wheel, L, which is pivoted to the top bar of the frame A, and which is connected with the upper part of the shaft G by the pulleys and band M N O, or equivalent gear-wheels, to give motion to said shaft.

By this construction the disks D E F and the wheels H will be revolved in opposite directions and at different velocities, so as to rub off the hulls as the kernels pass through the machine. The grain is introduced into the machine from a hopper, P, attached to the top bar of the frame A, and the discharge-opening of which is provided with a slide, Q, to enable the feed to be regulated as required. The hulled grain escapes through holes in the middle part of the wheel C, as indicated by the arrows.

Having thus described my invention, I claim as new and desire to secure by Letters Patent—

The combination of the disks D E F, provided with alternate concaved and flat emery surfaces, the wheels H, provided with alternate convexed and flat emery surfaces, the shaft G, the gear-wheels C J L, the pulleys and band M N O, or equivalent gearing, and the crank K, with each other, and the frame A, substantially as herein shown and described.

GEORGE H. PEABODY.

Witnesses:
JAMES T. GRAHAM,
T. B. MOSHER.